United States Patent
Ferraiolo et al.

(10) Patent No.: US 9,325,534 B2
(45) Date of Patent: Apr. 26, 2016

(54) CONFIGURABLE DIFFERENTIAL TO SINGLE ENDED IO

(75) Inventors: Frank D. Ferraiolo, Poughkeepsie, NY (US); Kevin C. Gower, LaGrangeville, NY (US); Robert B. Tremaine, Stormville, NY (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1803 days.

(21) Appl. No.: 12/568,765

(22) Filed: Sep. 29, 2009

(65) Prior Publication Data

US 2011/0075740 A1 Mar. 31, 2011

(51) Int. Cl.
*H04B 3/00* (2006.01)
*H04L 25/02* (2006.01)

(52) U.S. Cl.
CPC ................ *H04L 25/0272* (2013.01)

(58) Field of Classification Search
USPC ........................................................ 375/257
See application file for complete search history.

(56) References Cited

U.S. PATENT DOCUMENTS

| | | | | |
|---|---|---|---|---|
| 5,287,544 A | * | 2/1994 | Menich et al. | 455/450 |
| 6,424,217 B1 | * | 7/2002 | Kwong | 330/253 |
| 6,426,656 B1 | * | 7/2002 | Dally et al. | 327/51 |
| 7,107,498 B1 | * | 9/2006 | Schmidt et al. | 714/704 |
| 7,746,921 B1 | * | 6/2010 | Wik | 375/218 |

OTHER PUBLICATIONS

U.S. Appl. No. 12/165,804 entitled "Controlling for Variable Impedance and Voltage in a Memory System" by Daniel M. Dreps et al., filed Jul. 1, 2008.

* cited by examiner

*Primary Examiner* — Lihong Yu
(74) *Attorney, Agent, or Firm* — Robert R. Williams

(57) ABSTRACT

An electronic system having a power efficient differential signal between a first and second electronic unit. A controller uses information, such as compliance with data transmission rate requirement and bit error rate (BER) versus a BER threshold to control power modes such that a minimal amount of power is required. Amplitude of transmission and single ended or differential transmission of data are examples of the power modes. The controller also factors in a failing phase in a differential signal in selecting a minimal power mode that satisfies the transmission rate requirement of the BER threshold.

11 Claims, 8 Drawing Sheets

CONFIGURABLE DIFFERENTIAL TO SINGLE ENDED IO

FIELD OF THE INVENTION

This invention relates generally to signal transmission, and more specifically to differential signaling.

SUMMARY OF EMBODIMENTS OF THE INVENTION

Embodiments of the invention include methods and apparatus for reliable data transmission on a differential signal in an electronic system in a power efficient manner.

In an embodiment, an electronic system comprises a first electronic unit and a second electronic unit coupled by a differential signal further comprising a true phase and a complement phase. The electronic system further comprises a controller configured to reduce power dissipated during transmission of data from the first electronic unit to the second electronic unit on the differential signal based on information about the transmission of data.

In an embodiment, the information is measured bit error rate (BER) of other means of measuring errors in transmission of data. In an embodiment, the information is length of signaling conductors of the differential signal. In an embodiment the information is data transmission rate. In an embodiment the information is detection of a failure in a phase of the differential signal.

Power may be saved by using a minimal amplitude signal that satisfies a required data transmission rate and a BER threshold. Power may be saved by transmitting single ended if the required data transmission rate and the BER threshold are satisfied.

DETAILED DESCRIPTION OF THE EMBODIMENTS

In the following detailed description of embodiments of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the present invention provide for reducing power in transmission of signals, as well as for changing from differential signaling to single ended signaling. Additional embodiments provide for reduction of amplitude of a signal based on bit error rate or other detection of frequency of errors in data transmission. In view of fault conditions, or based on power characteristics and/or data transmission requirements, signaling can be changed from differential to single ended.

Figure 1:
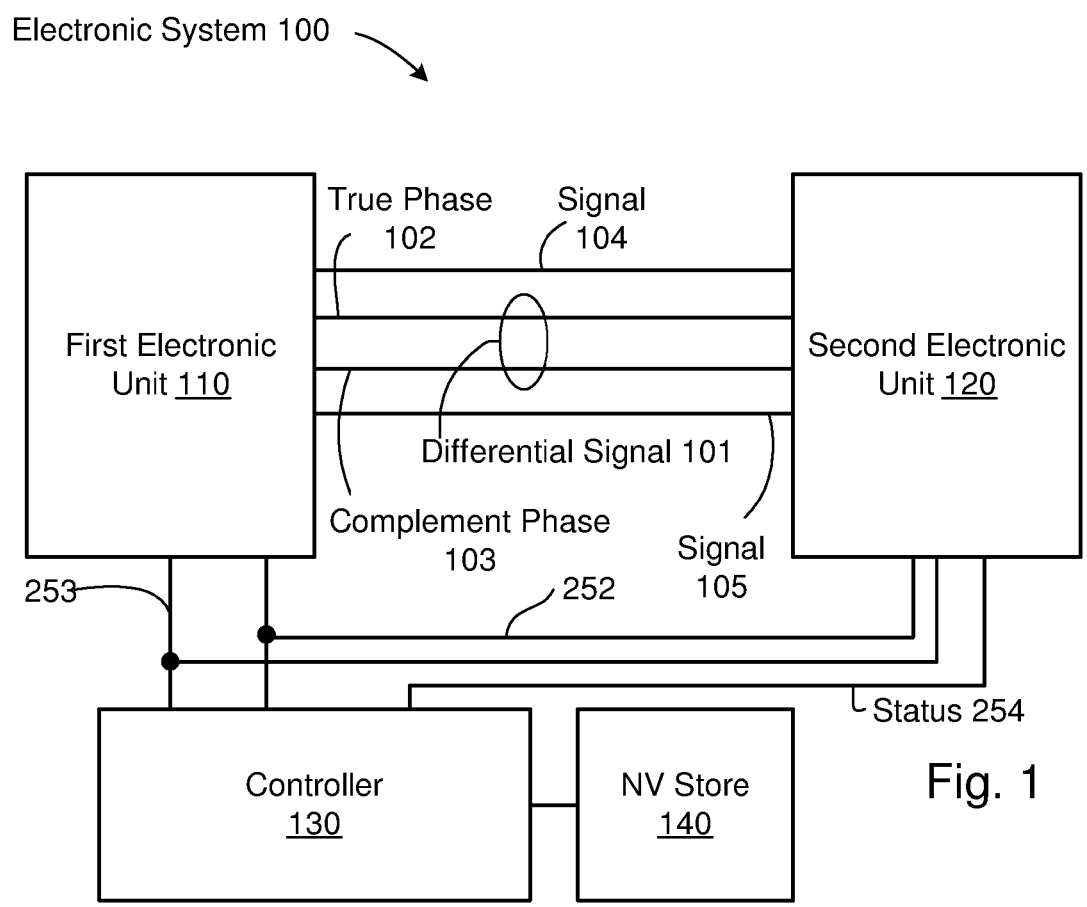
FIG. 1 is a block diagram of an electronic system comprising a differential signal and a controller configured for embodiments of the invention.

FIG. 1 shows an electronic system 100. Electronic system 100 may be a computer, electronic entertainment device, a personal digital assistant, or other electronic system. Electronic system 100 comprises a first electronic unit 110 and a second electronic unit 120. First electronic unit 110 is coupled to second electronic unit 120 by one or more differential signals 101, and, perhaps additional signals, such as signal 104 and signal 105. Differential signal 101 further comprises a true phase 102 and a complement phase 103.

Typically, a plurality of differential signals 101 is used in electronic systems. For example, first electronic unit 110 may be a memory controller in a computer system, and the second electronic unit 120 may be a buffer (hub) chip on a Dual Inline Memory Module (DIMM). For example, in JEDEC Standard, FBDIMM: Architecture and Protocol, JESD206, dated January, 2007, section 2.2 Physical Layer, "*The physical layer of the FBD channel uses high-speed point-to-point links. The signaling is dual simplex, allowing simultaneous data communications in both directions over low-voltage differential pairs.*" The section continues with a table indicating that, for a southbound data path, southbound, ten differential signals 101 are used. In a northbound data path, fourteen differential signals are used.

Referring still to FIG. 1, a controller 130 is coupled to first electronic unit 110 and to second electronic unit 120 by enable 252 and by impedance 253. Enable 252 and impedance 253 will be described in detail later with reference to FIG. 3. Enable 252 may comprise two signals per driver circuit to enable true phase 102 and complement phase 103 driven by each driver. Impedance 253 is used to control driver impedance. In an embodiment, a nonvolatile (NV) store 140 is used, for example, to retain information controller 130 used to control the one or more differential signals 101 prior to powering down of electronic system 100. NV store 140 may comprise any form of nonvolatile store, such as a hard disk, a flash memory. A status 254 signal(s) coupling second electronic unit 120 and controller 130 may communicate bit error rate or other measurement of data transmission errors.

In a differential signal 101, two signal conductors are used per logical signal, including the first signal conductor carrying a true phase 102 and the complement phase signal 103. Advantages in differential signaling include transmission of a common mode voltage, so that if a transient (or permanent) offset occurs in signal transmission, a differential amplifier at the receiver receiving the differential signal 101 will simply amplify a difference between the true phase signal 102 and the complement phase signal 103, as long as the common mode voltage of the true phase signal 102 and the complement phase signal 103 is within a common mode range of the differential receiver.

In a single ended signal, only one signal conductor is used, with a voltage transmitted being equal to or greater than a predefined least positive up level for a first logical value and less than or equal to a predefined most positive down level for a second logical value. Care must be taken in a single ended signal that supply (e.g., ground or Vdd) voltages do not have unacceptable steady state or transient differences between the first electronic unit 110 and the second electronic unit 120. Transient differences in supply voltage (e.g., ground bounce)

can cause the entire signal to be seen as "higher" or "lower" voltage by the receiver. The receiver, in single ended signaling, typically has a local (to the receiver) reference supplied or else the receiver has a switching threshold determined by device characteristics (e.g., if the receiver is a simple CMOS (complementary metal oxide semiconductor) inverter, the switching threshold is determined by width to length ratio of a P-channel FET (PFET) pull up and width to length ratio of the corresponding N-channel (NFET) pull down, and characteristics of the NFET and PFET, such as threshold values, transconductance, and the like). An advantage of transmitting with a single ended signal is that only one conductor per logical signal is required.

Embodiments of the present invention teach of configuring, in a first mode, drive and receive of true phase 102 and complement phase 103 such that true phase 102 and complement phase 103 are used for differential signaling. However, in a second mode, true phase 102 may be used to drive a single ended signal and, in a third mode, complement phase 103 may be used to drive a singled ended signal. Signal voltage amplitude on true phase 102 and complement phase 103 may be controlled. A controller 130 determines signal voltage amplitude and whether true phase 102 and complement phase 103 should be used to transmit data as a differential signal or be used as single ended using true phase 102 or complement phase 103.

Figure 2:
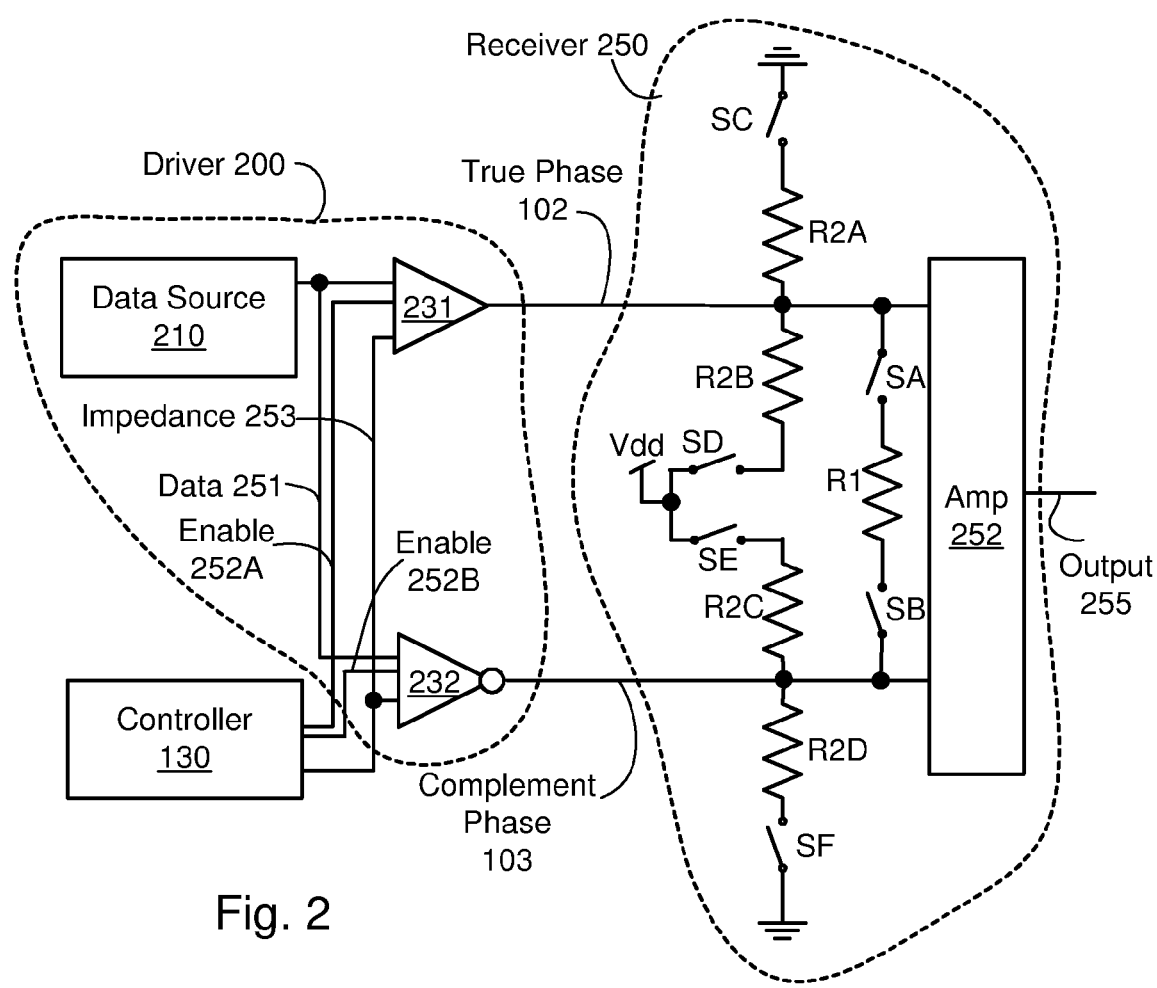
FIG. 2 is a schematic depicting a driver and a receiver suitable for embodiments of the invention.

Referring to FIG. 2, a driver 200 provides for a configurable drive of signals on true phase 102 and complement phase 103; a single ended signal on true phase 102; or a complement phase signal on complement phase 103. A receiver 250 provides for receiving a differential signal on true phase 102 or a singled ended signal on true phase 102 or a complement phase signal on complement phase 103. Driver 200 comprises a data source 210 that provides a signal to be transmitted from driver 200 to receiver 250. Data source 210 may, in embodiments, be considered separately from driver 200; for example, data source 210 may be a latch, or a set of combinatorial logic. Driver 200 comprises a driver portion 231 and a driver portion 232. Receiver 250 comprises an amplifier, typically a differential amplifier. Receiver 250 also comprises configurable termination elements, including switches SA, SB, SC, SD, SE, and SF, and resistors R1, R2A, R2B, R2C, and R2B.

Switches SA, SB, SC, SD, SE and SF provide configurable termination of true phase 102 and complement phase 103. Switches SA, SB, SC, SD, SE, and SF may be constructed of FET transfer gates or suitable polarity FETs (e.g., a PFET for switches connected to Vdd, and NFETs for switches connected to ground). Switches SA, SB, SC, SD, SE, and SF have low impedance compared to the resistor they are gating. Alternatively, a designer may include switch resistance in his termination. For example, if R2A is to be 100 ohms when switch SC has zero impedance, the designer may find that a FET switch has 20 ohms impedance, and then chooses an 80 ohm resistance for switch SC.

When a differential signal is transmitted over true phase 102 and complement phase 103, SA and SB are closed; SC, SD, SE, and SF are open. Clearly, SA and SB are redundant, to a degree, as opening either SA or SB will stop current through R1. However, the redundancy of SA and SB ensure that capacitance associated with RB is eliminated from both True Phase 102 and complement phase 103. High frequency differential signaling requires a high degree of matching (impedance, discontinuities, loadings) of true phase 102 and complement phase 103. If a characteristic impedance of true phase 102 and complement phase 103 are each 50 ohms, R1 should be 100 ohms, including, as described above, any resistance associated with associated switches.

Figure 3:
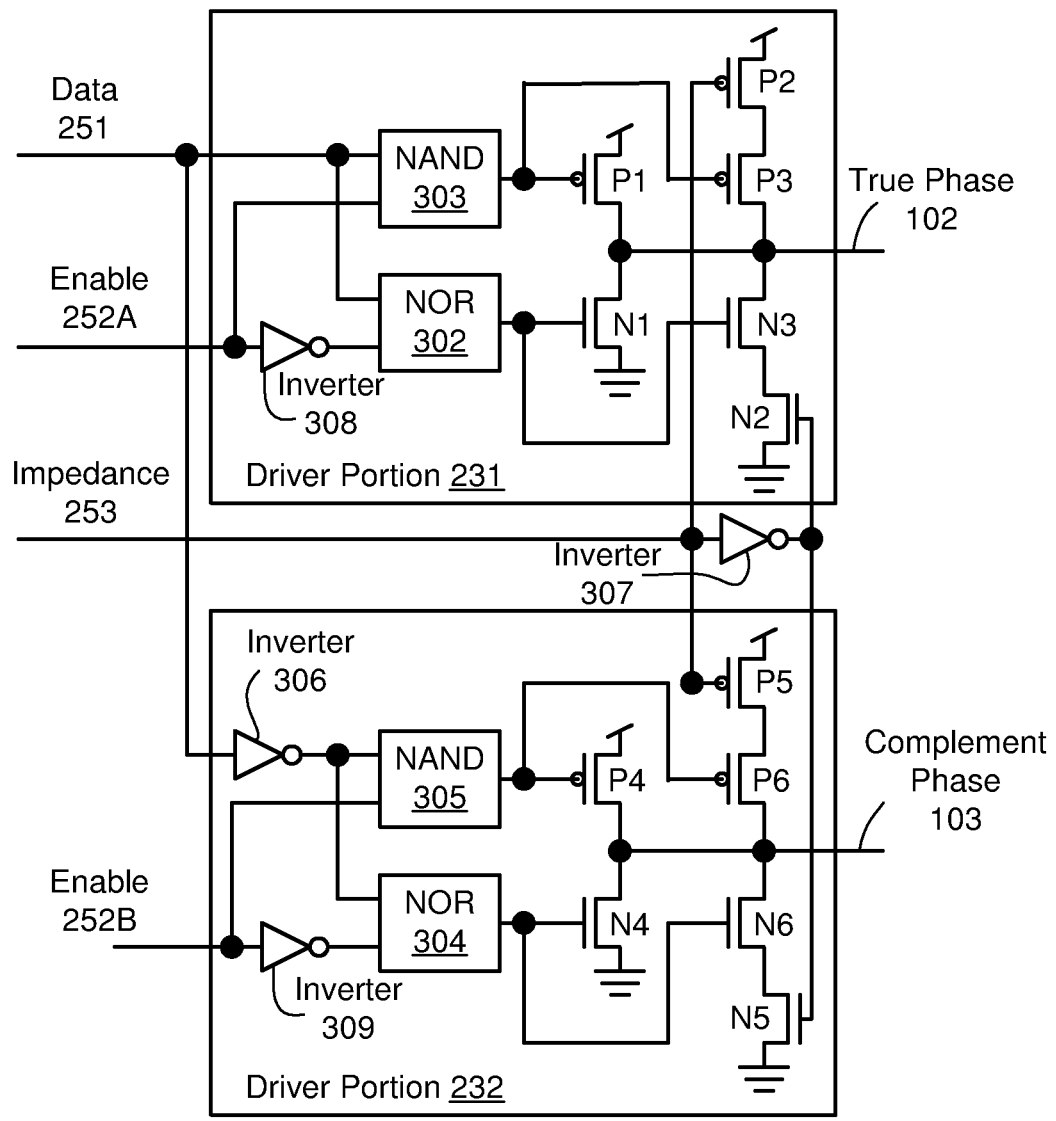
FIG. 3 is a schematic of a driver configured suitable for embodiments of the invention.

FIG. 3 shows a detailed schematic of driver portions 231 and 232.

Referring now to FIG. 2 and FIG. 3, if data is to be transmitted single ended on true phase 102, then driver portion 231 should be activated by a controller 130, and SA, SB, SE and SF should be open, and SC and SD should be closed. Driver portion 232 should be disabled, e.g., by placing driver 232 into a high impedance state by controller 130. A Thevenized impedance of R2A and R2B should be 50 ohms, and a Thevenized voltage of the R2A and R2B termination should be set at a desired switching threshold expected by an Amplifier 252 in receiver 250.

Likewise, if data is to be transmitted single ended on complement phase 103, then controller 130 should place driver portion 231 in a high impedance state, driver portion 232 in an active state, and SC, SD, SA, and B should be open, and SE and SF should be closed.

In an embodiment, wherein driver impedances of driver portions 231 and 232 can be made to approximate the characteristic impedance of true phase 102 and complement phase 103 closely enough to allow source terminated transmission, all switches (i.e., SA, SB, SC, SD, SE, and SF) should be opened and driver portion 231, 232, or both, are enabled by controller 130.

In an embodiment, driver currents from driver portions 231 and 232 are reduced, lowering the voltage swing on true phase 102 and complement phase 103. FIG. 3 shows a circuit diagram of circuitry configured to control driver currents from driver portions 231 and 232, as well as to put driver portion 231 or driver portion 232 (or both driver portions 231 and 232) into a high impedance state.

In FIG. 3, Data 251 is output by data source 210 (FIG. 2). In the embodiment shown in FIG. 3, only one data 251 is output by data source 210, however, data source 210 may also produce a true and a complement version of data 251, providing for identical circuitry in driver portions 231 and 232 (i.e., driver portion 232 would not be inverting, as depicted in FIG. 2).

In the embodiment shown in FIG. 3, data 251 is driven to a NAND 303 and a NOR 302 in driver portion 231. When enable 252A is high, data 251 will be drive to true phase 102. When enable 252A is low, driver portion 231 is in a high impedance mode and is not driving true phase 102. Inverter 308 provides a proper phase of enable 252A to NOR 302. An output of NAND 303 is coupled to PFETs P1 and P3. PFET P2 is gated by signal Impedance 253. When impedance 253 is active ("low", in FIG. 3), P2 and N2 are on, and, when driving true phase 102 high, P1 and a series combination of P2 and P3 are conducting current. When driving true phase 102 low, N1 and a series combination of N2 and N3 are conducting current. When impedance 253 is inactive ("high" in FIG. 3), P2 and N2 are turned off, and true phase 102 is pulled up by only P1 and pulled down only by N1. True phase 102 will be pulled up higher and pulled down lower when impedance 253 is low than when impedance 253 is high.

Inverter 307 provides a proper phase of impedance 253 to N2 in driver portion 231 and to N5 in driver portion 232.

Driver portion 232 works in the same manner, but includes inverter 306 such that driver portion 232 drives complement phase 103 with a phase inversion with respect to data 251. NAND 305 and NOR 304 logically combine an output of inverter 306 with enable 252B and drive the pull up devices P4 and P6 and the pull down devices N4 and N6. When impedance 253 is low, P5 and N5 are on, so that complement phase 103 is pulled up by P4 and a series combination of P5 and P6, and pulled down by N4 and a series combination of N5 and N6. When impedance 253 is high, P5 and N5 are off and complement phase 103 is pulled down only by N4, and pulled up only by P4. Complement phase 103 will be pulled up higher and pulled down lower when impedance 253 is low than when impedance 253 is high.

Note that controller 130 (FIG. 2) drives a first signal, enable 252A to driver portion 231 and a second signal, enable 252B to driver portion 232. Controller 130, therefore, can place either true phase 102 or complement phase 103 into a high impedance state.

The above has taught how driver 200 (FIG. 2) can be configured to drive data 251 as a differential signal capable of switching true phase 102 and complement phase 103 to a first (higher amplitude swing) and to a second (lower amplitude swing) using impedance 253. The above has also taught how driver 200 can be configured to drive data 251 to true phase 102 but not to complement phase 103 (i.e., enable 252A "high"; enable 252B "low"). The above has further taught how driver 200 can be configured to drive data 251 (complemented) to complement phase 103 but not to true phase 102 (i.e., enable 252A "low"; enable 252B "high").

Figure 8:
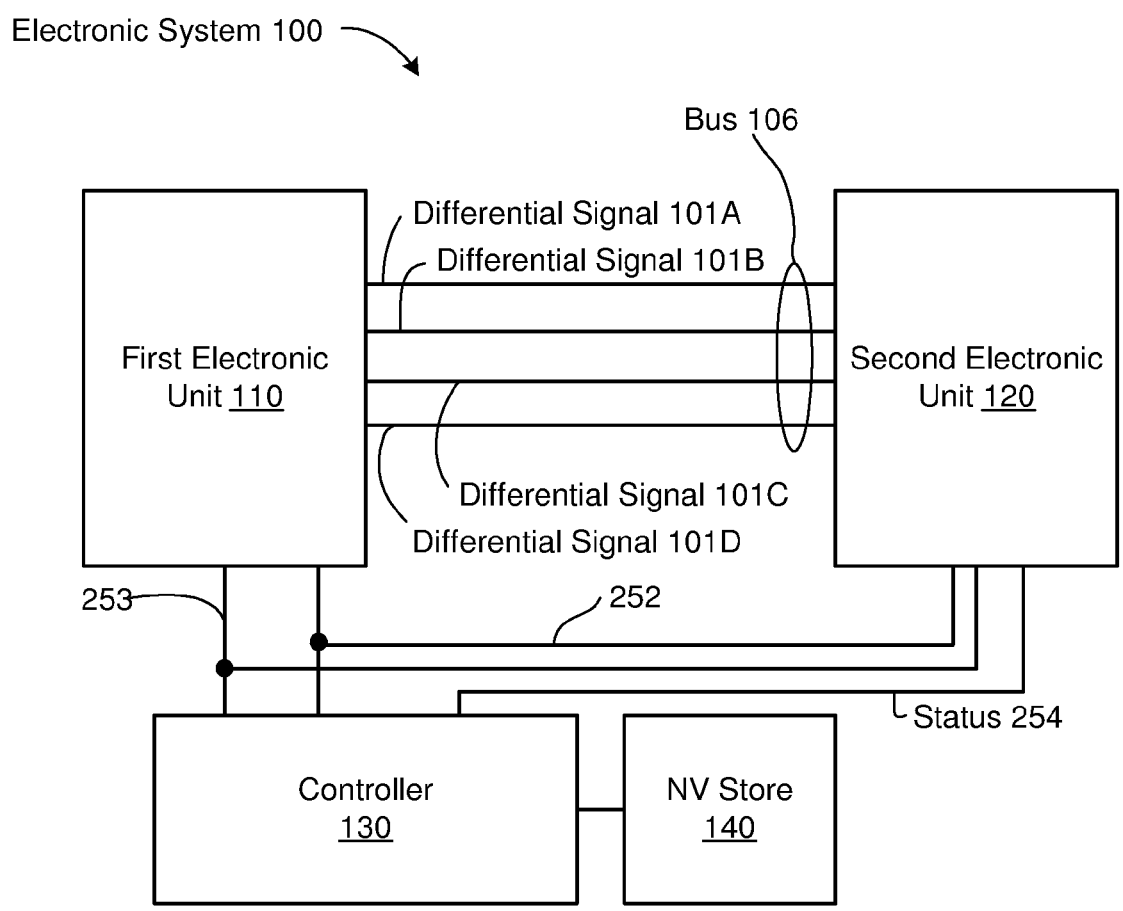
FIG. 8 shows a plurality of differential signals forming a bus.

First and second instances of differential signal 101 have been discussed earlier. First and second instances of differential signal 101 are often used in a multi-lane bus, such as bus 106, depicted in FIG. 8. Other items in FIG. 8 are as described in FIG. 1. For simplicity, true phase 102 and complement phase 103 are not shown in differential signals 101A-101D in FIG. 8.

In many applications, bus 106 may be of different length in a first instance of electronic system 100 than in a second instance of electronic system 101. For example, bus 106 may comprise a cable having a first length in the first instance of electronic system 101, and bus 106, in the second instance of electronic system 101 may comprise a cable having a second length.

With reference to FIG. 8, and the discussion above, in an embodiment, second electronic unit 120 reports, on status 254, a bit error rate (BER, or, equivalently, CRC error frequency, etc) for bus 106. Controller 130, responsive to the error rate, controls drivers 200 and receivers 250 (FIG. 2) of all signals 101A in bus 106 in parallel to operate in a configuration that keeps the error rate of data transmission on bus 106 at or below a BER threshold, as taught earlier with respect to each differential signal 101. In the instant embodiment, it may be that some particular differential signals 101 may not be operating at as low power as possible; however, controller 130 can more quickly set the configuration by controlling all differential signal links 101 in parallel. In a variation of the instant embodiment, controller 130 first, in parallel, configures all drivers 200 and receivers 250 in bus 106 as explained above in this paragraph, and then "fine tunes" each instance of differential signal 101 as taught earlier. The parallel configuration quickly covers "gross physical variations", such as installation of different cable lengths; the controller then proceeds with "vernier", or "fine", control of each instance of differential signal 101 to reduce power when possible, as taught earlier.

Figure 5:
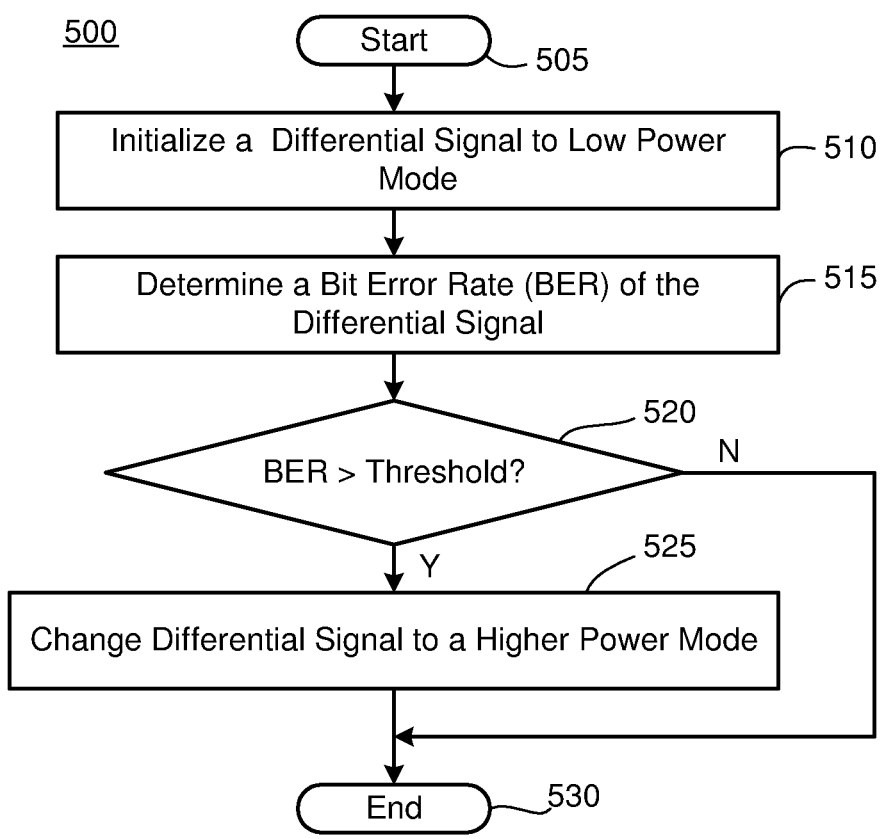
FIG. 5 is a flowchart of a method to reduce power in a differential signal
Figure 6:
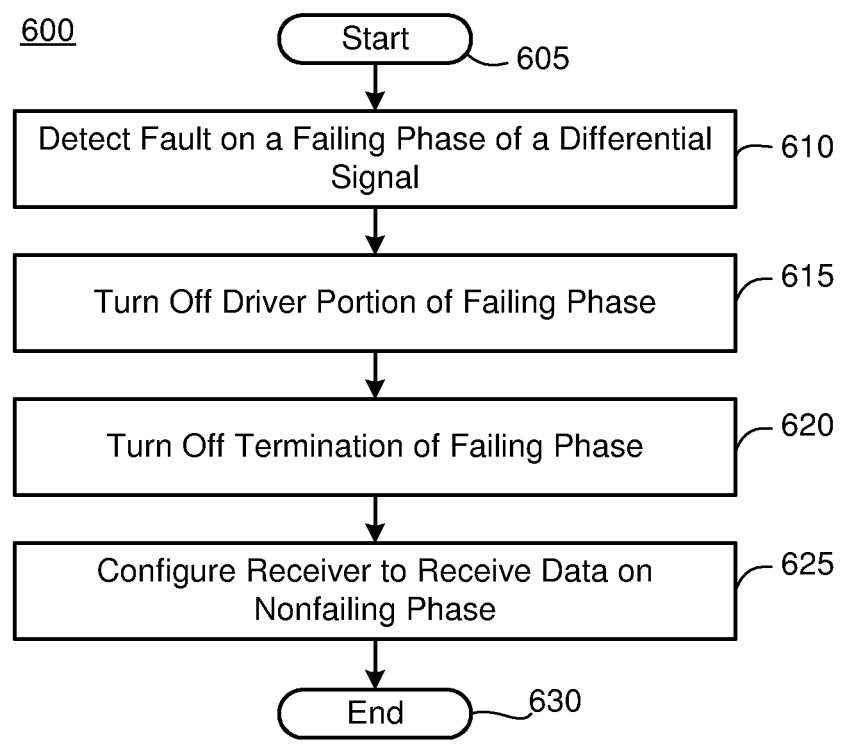
FIG. 6 is a flowchart of a method to use single ended signaling if a failure is detected in a phase of a differential signal.

Methods of using driver 200 and receiver 250 in electronic system 100 will now be discussed. FIGS. 5 and 6 are high level flowcharts of method 500 which deals with power reduction; method 600 deals with failure on a phase of a particular differential signal 101. A summary of the blocks of FIGS. 5 and 6 will follow the detailed description of method actions below.

Typically, an electronic system 100 comprises a plurality of differential signals 101, and, whereas a designer ensures that true phase 102 and complement phase 103 are closely matched, physical limitations generally cause a first instance of differential signal 101 to have a different length (of physical signaling conductors associated with the first instance of differential signal 101) than a second instance of differential signal 101. In many cases, the second instance of differential signal 101 has physical constraints (e.g., a longer signal path than the first instance of differential signal 101) that make it difficult to reliably provide a required data transmission rate for the second instance of differential signal 101. The first instance of differential may have shorter signaling conductors and easily meets the required data transmission rate for the first instance of differential signal 101.

In an embodiment, second electronic unit 120 reports a bit error rate (BER) to controller 130 on status 254. Controller 130 compares the BER against a BER threshold supplied by a designer. BER is typically on the order of $10^{**}-12$. Controller 130, when the system is being initialized, causes impedance 253 to be "high", placing all instances of driver 200 in a relatively low power mode, i.e., having a relatively low amplitude swing on differential signal 101.

During bring up and training of signaling, following the example above, a BER of the first instance of differential signal 101 is lower than the BER threshold, and a BER of the second instance of differential signal 101 is higher than the BER threshold. Controller 130 responds by leaving impedance 253 of the driver 200 of the first instance of differential signal 101 to be "high", leaving the amplitude of transmission of the first instance of differential signal at the relatively lower amplitude, and keeping power dissipated in driving the first instance of differential signal 101 relatively low. The second instance of differential signal, having longer signaling conductors, may have a BER higher than the BER threshold, and controller 130 therefore changes the driver 200 that drives the second instance of differential signal 101 into the higher amplitude (higher power) mode (i.e., changes the corresponding impedance 253 to "low").

In the example above, second electronic unit 120 reported a BER rate to controller 130. In alternative embodiments, ECC (Error Checking and Correcting) rates any time during operation may exceed an ECC threshold, indicating a problematic instance of differential signal 101 that would be reported by second electronic unit 120 on status 254, and controller 130 would respond by increasing amplitude of signals on the problematic instance of differential signal 101.

In another embodiment, a designer having knowledge of one or more layout characteristics (e.g., length) of instances of differential signal 101 may program a value for impedance 253 for each instance of differential signal 101 into a non-volatile (NV) store, such as NV store 140 in FIG. 1. Controller 130 reads NV store 140 and causes the corresponding impedance 253 for each instance of differential signal 101 to be "high" or "low" according to the values read from NV store 140.

In the above examples wherein differential signal 101 is transmitting using differential signaling, SA and SB are closed; SC, SD, SE, and SF are open.

Transmitting a differential signal with a relatively smaller amplitude results in power savings. Whereas only two amplitude options are shown for example (i.e., impedance 253 being "high" or "low"), additional amplitude options are contemplated. For example additional instances of P2, P3, N2, N3, P5, P6, N5, and N6 can be provided in driver 200, controlled by additional impedance 253 signals sent by controller 130 to driver portions 231 and 232 in driver 200. Given a large number of amplitude options, each instance of differential signal 101 can be driven with just enough amplitude to meet the BER threshold. However, the designer must make a tradeoff between increasingly smaller power savings versus additional circuit area and complexity.

It may be that a fault occurs on true phase 102 or complement phase 103. For example, driver portion 231 or driver portion 232 may experience a failure. For another example, a short circuit (to ground, to Vdd, for examples) or an open circuit (broken signaling conductor, open solder joint, for examples) may occur.

Figure 4:
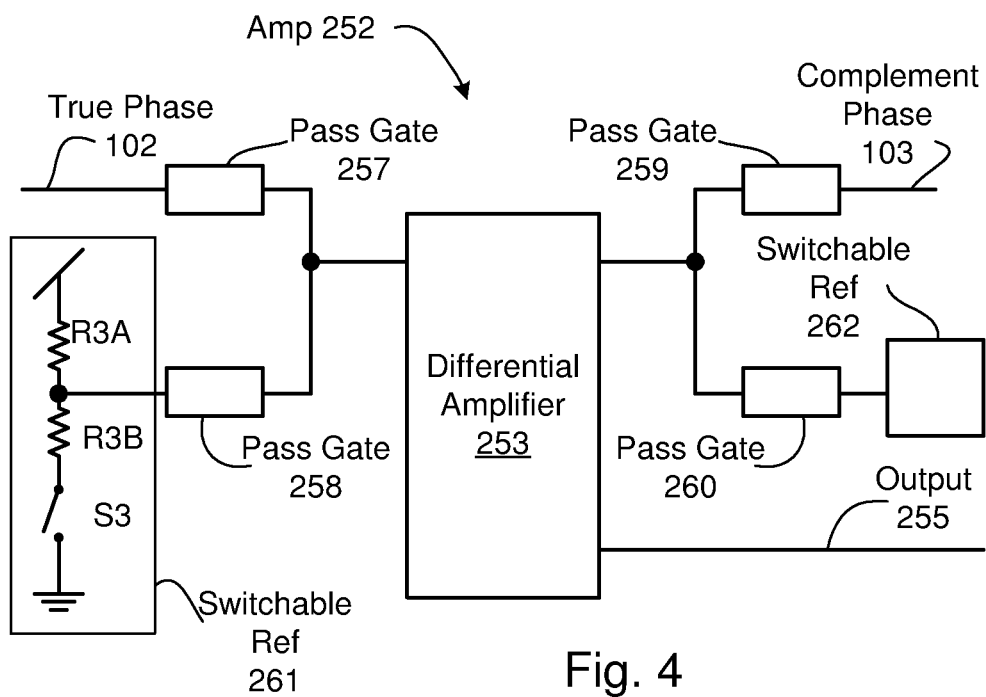
FIG. 4 is a schematic of a receiver configured to perform as a differential receiver or as a single ended receiver for either of two signal conductors in a differential signal.

Controller 130 may respond to a fault on true phase 102 or complement phase 103 by causing single ended transmission. For example, suppose that true phase 102 has developed a fault. Controller 130, in an embodiment, opens switches SA and SB; controller 130 also opens switches SC and SD, and closes switches SE and SF. Controller 130 also signals amp 252 that signaling is to be done single ended, using complement phase 103. Amplifier 252, in response, uses an internal reference as a switching threshold for the signal on complement phase 103. FIG. 4 shows additional details of amplifier 252. Differential amplifier 253 is a conventional differential amplifier that amplifies a difference between two inputs and drives an output accordingly. FIG. 4 comprises pass gates 257, 258, 259 and 260 which are controlled by controller 130 (interconnections to controller 130 omitted for simplicity). Two instances of a switchable reference (261 and 262) are shown. When receiving a differential signal on true phase 102 and complement phase 103, pass gate 257 and 259 are made conducting; pass gates 258 and 260 are made nonconducting, and switch S3 in switchable references 261 and 262 are open. Differential amplifier 253 therefore receives signals on true phase 102 and complement phase 103 and drives output 255 accordingly.

If a fault is detected (through conventional means, such as "wire test" or other tests) on true phase 102, complement phase 103 is made to drive single ended, as described above. SE and SF are closed; SA, SB, SC, and SD are open. Pass gate 257 is nonconducting, pass gate 259 is made conducting to connect complement phase 103 to differential amplifier 253. Switch S3 in switchable reference 261 is closed. Pass gate 258 is made conducting to transfer a reference voltage produced by the series R3A, R3B (and any resistance in S3) to differential amplifier 253. Pass gate 260 is nonconducting. S3 in switchable reference 262 is open to eliminate current flow through R3A and R3B in switchable reference 262.

If a fault is detected on complement phase 103, pass gates 257 and 260 are made conducting; pass gates 258 and 259 are made nonconducting. S3 in switchable reference 261 is opened; a corresponding switch S3 in switchable reference 262 is closed. As described earlier with reference to driver 200, true phase 102 is driven single ended and complement phase 103 is put into high impedance. SA, SB, SE and SF are open; SC and SD are closed, thereby providing termination on true phase 102.

In an embodiment, controller 130 is aware of power required in each mode (i.e., high amplitude differential; low amplitude differential; high amplitude single ended; low amplitude single ended) and chooses a lowest power mode that satisfies a bandwidth requirement and a BER requirement.

As discussed above, a low amplitude differential may be a lowest power mode when driving relatively short nets at a high bandwidth. Controller 130 will select this mode in absence of faults on true phase 102 and complement phase 103 as long as BER targets are satisfied.

If driving single ended on true phase 102 or complement phase 103 is of lower power than using differential signaling and data transmission rate and BER are satisfied, controller 130 controls driver portions 231 and 232, switches, and pass gates accordingly, as taught above. It may be that, referring to FIG. 1, signal 104, which is closely coupled to true phase 102, is a very noisy line (e.g., high voltage, fast transition, etc), whereas signal 105, which is closely coupled to complement phase 103, has slow transitions and/or low voltage swings and therefore does not significantly affect signaling on complementary phase 103. In such a situation, a BER on true phase 102 would be higher than a BER on complement phase 103. Controller 130 may examine BER during single ended signaling on true phase 102, followed by examining BER during single ended signaling on complement phase 103, and, finding a lower BER on complement phase 103, select single ended transmission on complement phase 103.

Controller 130 may determine that bandwidth available exceeds quality of service requirements, or that utilization of electronic system 100 is low. To save power, switching rates on differential signal 101 may be reduced, for example, from 1 GHz (one gigahertz) to 0.5 GHz. Typically, BER drastically improves (becomes lower) as lower frequency transmission is used. When controller 130 determines that data transmission rates can be reduced to an acceptable reduced data transmission rate, controller 130 again lowers power, as taught above, by choosing a lowest power mode at the acceptable reduced data transmission rate that satisfies the BER requirement.

Some electronic systems 100 may employ a robust error correction scheme, so that a larger BER can be tolerated, allowing controller 130 to again reduce power as taught above. In addition, some applications (software programs running in electronic system 100) may be more tolerant of BER than other applications. For example, a defense industry electronic system 100 may require far fewer errors than a game electronic system 100. Controller 130 may receive information from an application and dynamically reduce power, using the apparatus and techniques described above, while tolerating a higher BER specified by the application.

Referring now to FIG. 5 which gives a high level flowchart of method 500, method 500 begins as block 505.

In block 510, a differential signal is initialized to a low power mode, as taught earlier. An electronic system 100 will typically initialize all or most of associated differential signals 101 to the low power mode. If, however, designer input has been stored in NV store 140, controller 130 will comply with any power mode provided by the designer.

In block 515, controller 130, as described earlier, receives a bit error rate (BER) from second electronic unit 120 (or, alternatively, receives information during operation about CRC errors, or other indications as to how often errors on a differential signal 101 occur).

In block 520, controller 130, as described earlier, compares the BER of the differential signal 101 (or other indicator of error rate) against a BER threshold. If the error rate is greater than the BER threshold, data is not being transmitted reliably (per the specified BER threshold), and, in block 525, power is increased for the differential signal by reducing impedance of driver portions 231 and 232 of driver 200, which increases signal amplitude, and raises power. If, on the other hand, block 520 determines that BER is less than the specified BER threshold, power of the differential signal is not changed. It will be understood, as explained earlier, that if more than two power options are available in a particular driver 200, blocks 515, 520, and 525 may be iterated to find a power option having a least amount of power for differential signal 101 that satisfies the BER threshold.

It is further understood that controller 130, in embodiments, is aware of power for all amplitudes of signals, as well as power in a single ended mode. If a single ended mode is of less power than a differential signaling mode, block 510 may initialize the differential signal 101 to a single ended mode. As further explained earlier, controller 130 may also determine whether, while in a particular amplitude mode during single ended signal transmission, true phase 102 or complement phase 103 has a lower BER, and then use true phase 102 or complement phase 103, whichever has the lower BER.

Controller 130, in embodiments is aware of a required rate of data transmission. During times of low use of electronic system 100, required rate of data transmission may be reduced. Controller 130, in an embodiment, responds by reducing data transmission rate, e.g., from 1 GHz to 0.5 GHz, and performing method 500 again to configure driver 200 and receiver 250 to a minimum amount of power needed to reliably transmit data at the reduced transmission rate.

A programmable BER threshold may be used by controller 130. As explained, some electronic systems 100 must transmit data more reliably than other electronic systems 100. Or, some first electronic unit 100 and second electronic unit 120 may have more robust error detection and correction capabilities than others. A highly robust error detection and correction capability may also allow for data transmission using lower power on differential signal 101, since a higher BER can be tolerated, the BER threshold can be set to a higher value.

Turning now to FIG. 6, method 600 begins at block 605. In block 610, a fault is detected on a failing phase of differential signal 101. As explained earlier, "wire test" or other test mechanism may be used to determine a failing phase. In response, controller 130, in block 615, turns off the driver portion (driver portion 231 or driver portion 232 in driver 200). For example, referring to FIG. 3, if a failure is detected on complement phase 103, enable 252B would be deactivated (brought to a logic "0" in the exemplary circuit). In block 620, termination of the failing phase is turned off. In the termination of FIG. 2, switches SA, SB, SE, and SF would be opened, and SC and SD closed, if complement phase 103 is the failing phase.

In block 625, in receiver 250, amplifier 252 is configured to receive a single ended signal (e.g., on true phase 102 if a failure has been detected on complement phase 103). As described earlier, if a single ended signal is transmitted on true phase 102, pass gate 258 and pass gate 259 are open, pass gate 257 and 260 are set to pass signals, switchable reference 262 is activated, and switchable reference 261 is inactivated.

Upon configuring driver 200 and receiver 250 as above to transmit single ended over the remaining phase of differential signal 101, method 500 may be used to determine an amplitude of transmission on the remaining phase that is required to reliably transmit data. If a highest amplitude (highest power) transmission is unable to reliably transmit data on the remaining phase, data transmission rate must be reduced (for example controller 130 forces electronic unit 110 and electronic unit 120 to transmit and receive more slowly). Alternatively, electronic system 100 may be shut down until the failure can be corrected.

Figure 7:
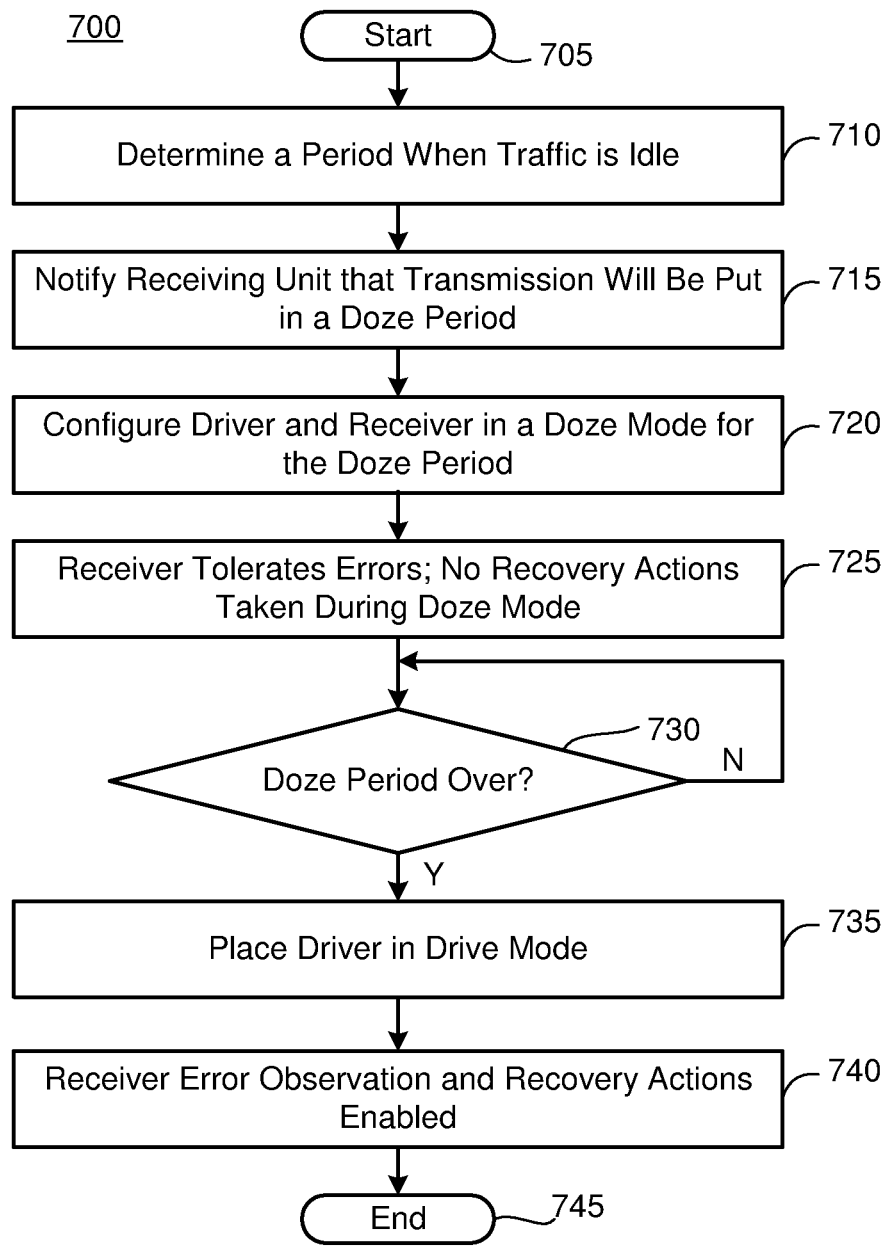
FIG. 7 is a flowchart of a method to place a differential signal in a doze mode for a period of time.

Turning now to FIG. 7, a method 700 is shown. Method 700 saves power by placing differential signal 101 in a doze period for a predetermined period of time (a number of bus cycles).

Method 700 begins at block 705. In block 710, controller 130 determines when traffic (amount of transmission of data) on differential signal 101 is light or idle, or if a quality of service can be satisfied with more latency for transfers over differential signal 101. For example, if differential signal 101 is a link to memory DIMMs, controller 130 may find that a write queue and a read queue in controller 130 are empty or almost empty.

Upon determining, in block 710, that traffic is less than a specified traffic threshold, indicating that traffic on differential signal 101 is idle or may be deferred on differential signal 101, controller 130, in block 715, notifies electronic unit 120 that transmission on differential signal 101 will be placed in a doze period for a predetermined period of time or number of bus cycles (e.g., 64 bus cycles, 128 bus cycles, etc). A number of cycles making up the doze period may be programmable. For example, if controller 130 determines that very little traffic on differential signal 101 is occurring, a 128 bus cycle doze period may be set; if moderate traffic on differential signal 101 is occurring, a 64 bus cycle doze period may be set. If a low priority task is generating the traffic on differential signal 101, controller 130 may set a relatively longer doze period than if the traffic is being generated by a high priority task.

In block 720, driver 200 and receiver 250 are placed in a configuration for the doze period.

In an embodiment of the configuration for the doze period, driver portion 231 and driver portion 232 are both turned off (enable 252A and enable 252B both set to "low" in circuitry of FIG. 2). Switch SC and SE are closed; SA, SB, SD, SF are opened. True phase 102 will be at ground; complement phase 103 will be at Vdd.

In another embodiment of the configuration for the doze period, driver portion 231 and driver portion 232 are placed in the low amplitude mode described earlier (impedance 253, FIG. 3, set "high"). SA and SB are closed; SC, SD, SE, SF are opened. Driver 200 is then set to drive a logical "1" (or a logical "0") for the duration of the doze period. Some current will flow through R1, however power will be saved if differential signal 101 had been operating in a higher amplitude mode prior to entering the doze period.

In block 725, second electronic unit 120 is set to tolerate or ignore errors and to take no recovery actions during the doze period. Taking recovery actions would cause communication between second electronic unit 120 and controller 130, which would dissipate power. During the doze period, no data is transmitted, therefore errors (e.g., in CRC) would normally happen in the doze period.

Block 730 watches for expiration of the predetermined doze period. When the doze period has expired, block 735 restores normal driver operation (in whatever mode the driver had been in prior to the doze period, for examples, differential high amplitude, differential low amplitude, single ended on true phase 102, single ended on complement phase 103). In block 740, the receiver again watches for errors and will again take recovery actions (e.g., request retransmit in the event of an error, report errors to controller 130, correct errors with ECC logic, and the like). Block 745 ends method 700.

What is claimed is:

1. An electronic system comprising:
   a first electronic unit and a second electronic unit, the first electronic unit and the second electronic unit coupled by a resistively terminated_differential signal, the resistively terminated differential signal further comprising a true phase and a complement phase; and
   a controller configured to reduce power dissipated during transmission of data from the first electronic unit to the second electronic unit on the differential signal by configuring a driver and a receiver of the resistively terminated_differential signal to select between a lower power mode and a higher power mode based on information about the transmission of data.

2. The electronic system of claim 1, wherein the information is measured bit error rate (BER) relative to a BER threshold.

3. The electronic system of claim 1 wherein the BER threshold is programmable.

4. The electronic system of claim 1, wherein the information is physical information about the signaling conductors.

5. The electronic system of claim 4, wherein the physical information is length of signaling conductors of the differential signal.

6. The electronic system of claim 1, wherein the information is a data transmission rate requirement.

7. The electronic system of claim 1, wherein the information is a fault in one phase of the differential signal.

8. The electronic system of claim 1, wherein an amplitude of signal is lowered to reduce power.

9. The electronic system of claim 1, wherein single ended data transmission is used to reduce power.

10. The electronic system of claim 1, wherein the information is traffic on the differential signal.

11. The electronic system of claim 8, wherein the controller configures the first electronic unit and the second electronic unit to effect a doze period on the differential signal responsive to detection of traffic on the differential signal being less than a traffic threshold.

\* \* \* \* \*